J. W. CALKINS.
MACHINE FOR SAWING LATH.

No. 181,310. Patented Aug. 22, 1876.

WITNESSES:  INVENTOR:

UNITED STATES PATENT OFFICE.

JOHN W. CALKINS, OF AVOCA, NEW YORK.

IMPROVEMENT IN MACHINES FOR SAWING LATHS.

Specification forming part of Letters Patent No. 181,310, dated August 22, 1876; application filed June 26, 1876.

*To all whom it may concern:*

Figure 1:
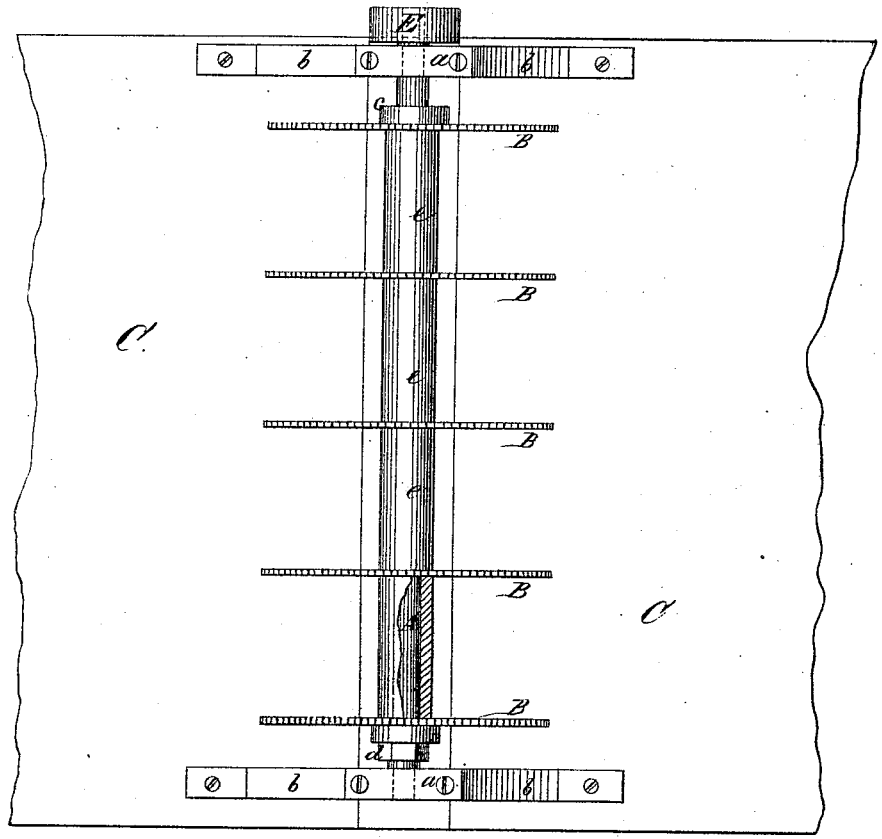
Figure 2:
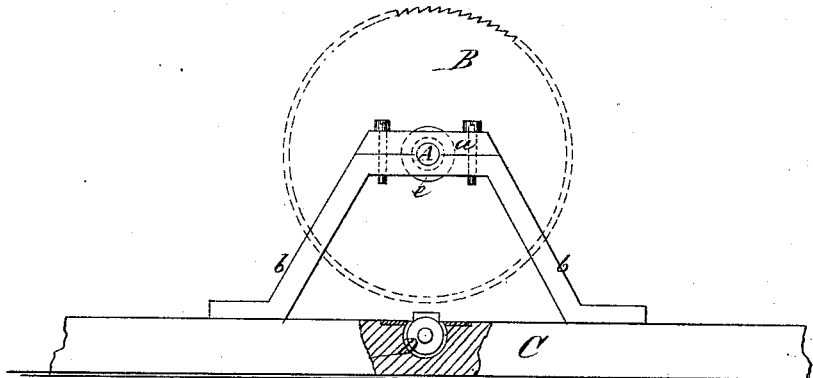

Be it known that I, JOHN W. CALKINS, of Avoca, in the county of Steuben and State of New York, have invented an Improvement in Machines for Sawing Laths, of which the following is a specification:

Figure 1 is a top view. Fig. 2 is an end elevation.

Similar letters of reference indicate corresponding parts.

My invention consists of a mandrel carrying a number of saws, separated the required distance by washers, and a frame for supporting the same, together with a friction-roller, placed in the table, over which the saws run.

A is a mandrel, revolving in journal-boxes $a\ a$, which are supported the proper distance above the table by the legs $b\ b$. B B, &c., are saws, which are secured to the mandrel A by being clamped between the collar $c$ and nut $d$. The intervening washers $e$ regulate the distance between the saws. The legs $b\ b$ are attached to the table C, and support the saws a small distance above the table. D is a roller placed in the table in such a way as to project a little above the surface of the table, to relieve the friction of the board passing under the saws. A pulley, E, is attached to the mandrel, to which power is communicated by a belt.

The saw-mandrel may be placed on adjustable standards, and, if desired, the roller in the table may be dispensed with. This machine will rapidly and simultaneously cut a number of longitudinal grooves in a board. The number of grooves and the distances between them is governed by the thickness of the washers $e$. The arrangement of the saws and table may be reversed, the saws being placed under the table, and projecting through and above the table sufficiently to cut a groove of the required depth.

The advantages claimed for a board grooved or formed into a series of connected laths are, that it may be more rapidly applied to the walls and ceiling of a building, it produces a more solid wall or ceiling, and it does away with sheathing.

I am aware that circular saws have been arranged at intervals on the same rotary shaft; but

What I claim is—

The combination, with a series of rotary saws on the same mandrel, of the directly subjacent roller D, placed in, but projecting above, table, as shown and described.

JOHN W. CALKINS.

Witnesses:
    JOHN D. GRISWOLD,
    CHAS. A. PECK.